W. MANSFIELD.
Apparatus for Utilizing the Force of Currents of [Air?]
passing through Chimneys.

No. 237,986. Patented Feb. 22, 18[81].

Attest. Inve[ntor]

W. MANSFIELD.
Apparatus for Utilizing the Force of Currents of Fluids passing through Chimneys.

No. 237,986.   Patented Feb. 22, 1881.

5 Sheets—Sheet 2.

Attest.
E. R. Hill
Jno. N. Strehli

Inventor.
William Mansfield
per Wm. Hubbell Fisher,
Atty

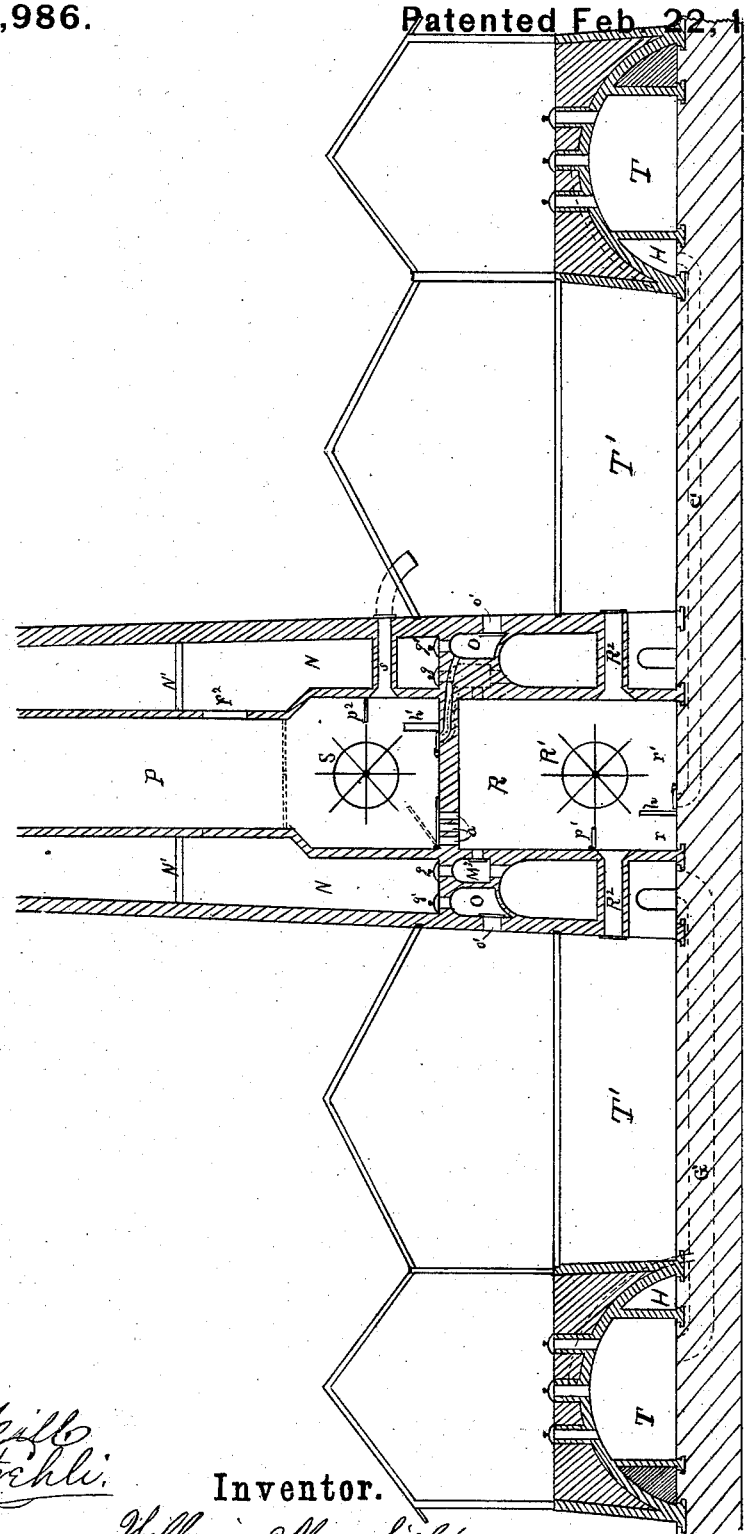

W. MANSFIELD.
Apparatus for Utilizing the Force of Currents of Fluids passing through Chimneys.
No. 237,986. Patented Feb. 22, 1881.
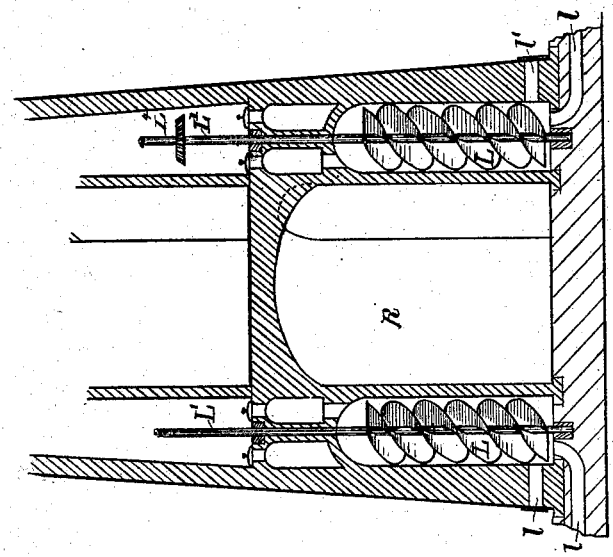
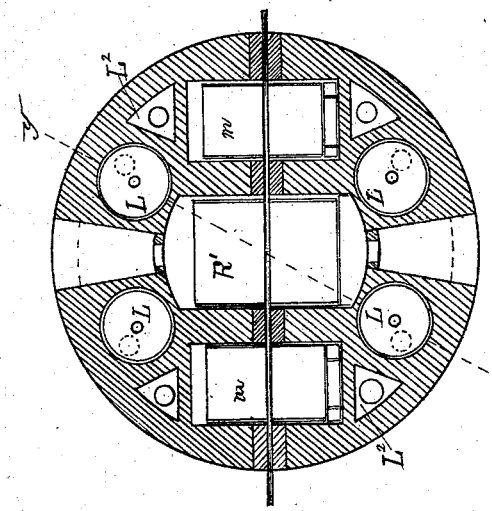
Attest.
Inventor.

UNITED STATES PATENT OFFICE.

WILLIAM MANSFIELD, OF AVONDALE, OHIO.

APPARATUS FOR UTILIZING THE FORCE OF CURRENTS OF FLUIDS PASSING THROUGH CHIMNEYS.

SPECIFICATION forming part of Letters Patent No. 237,986, dated February 22, 1881.

Application filed May 26, 1879.

*To all whom it may concern:*

Be it known that I, WILLIAM MANSFIELD, of the village of Avondale, in the county of Hamilton and State of Ohio, have invented certain new and useful Apparatus for Utilizing the Force of the Currents of Fluids Passing Through Chimneys, of which the following is a specification.

My invention consists in a novel and useful construction of the chimney and the combination, with the latter, of certain useful appliances, whereby I am enabled to employ the currents of air, gas, smoke, &c., passing through the chimney in operating machinery, and am further enabled to ventilate mines, sewers, tunnels, &c., by the use of the blower for driving in the pure air, when necessary, and sucking out all foul air, smoke, or other obnoxious gases, and, if necessary, burning the same before allowing the said foul air, smoke, or other obnoxious gases to ascend the stack. The blowers are also intended for the transmission of hot or cold air for various drying purposes, such, for example, as drying tobacco, glue, laundry-work, lumber, brick and clay goods, &c.

A second portion of my invention consists in the combination of the same with a brick-kiln and drying-sheds in such a manner as to fully illustrate and explain in general the use and functions of the first portion of my invention.

Figure 3:
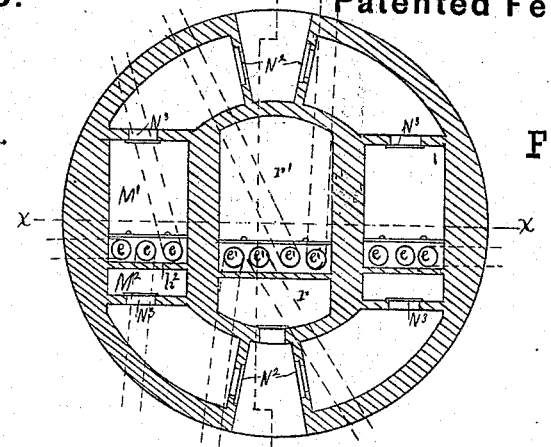
Figures 1, 2:
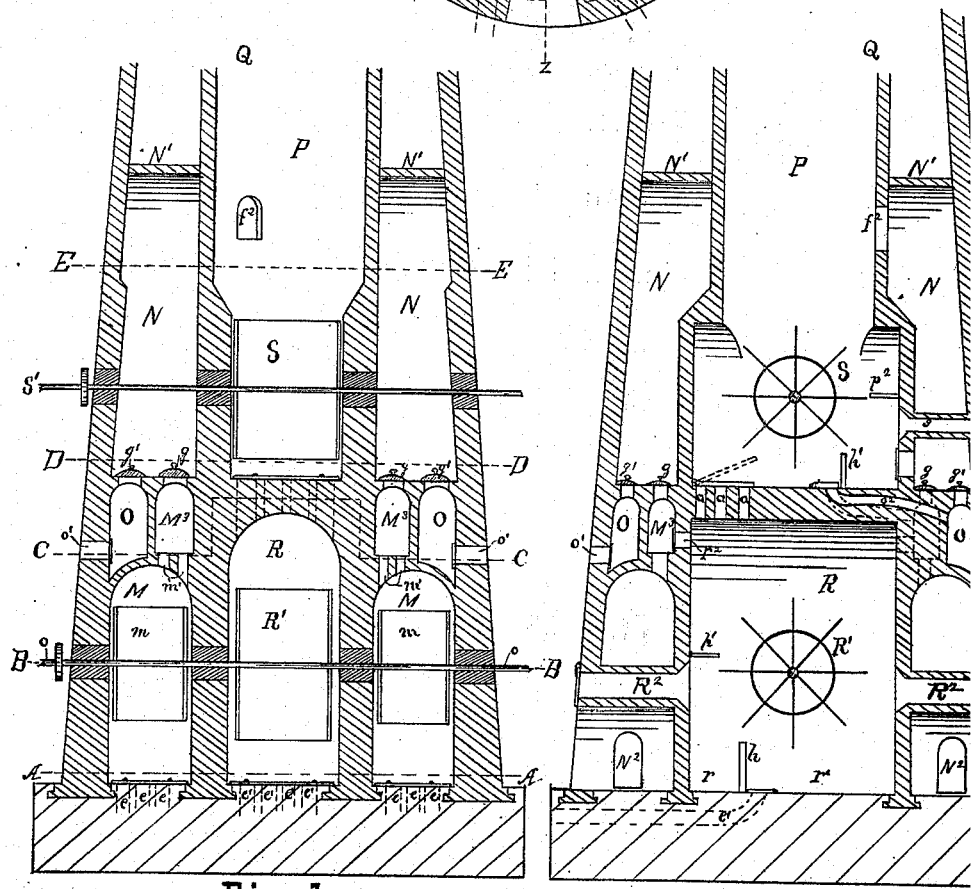
Figure 7:
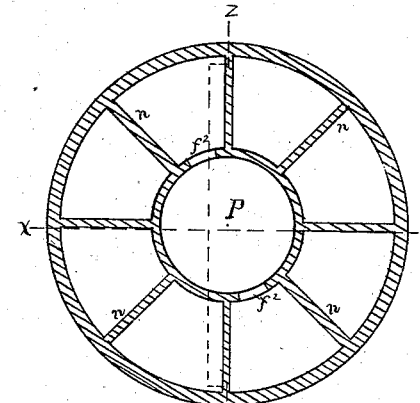
Figure 6:
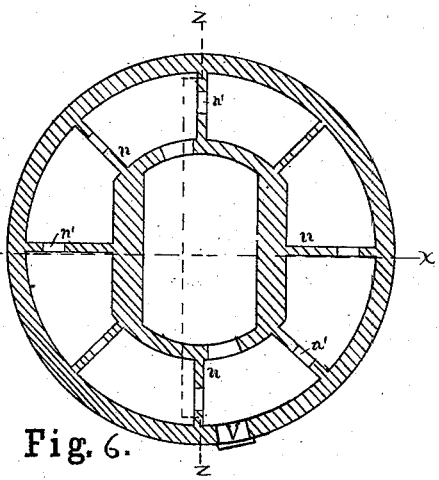
Figure 4:
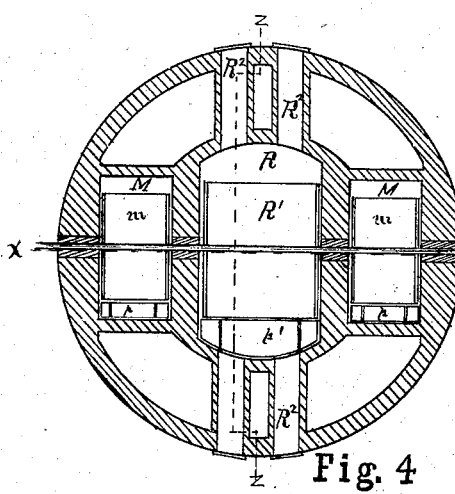
Figure 5:
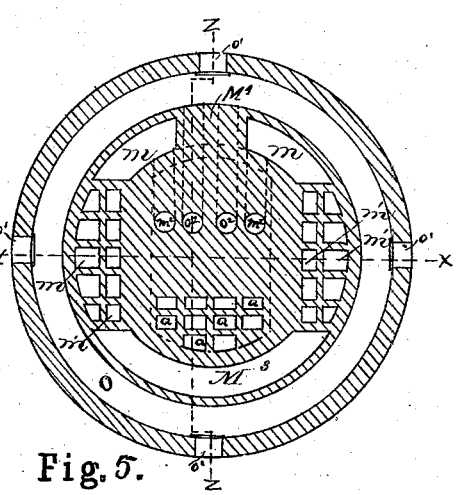
Figure 8:
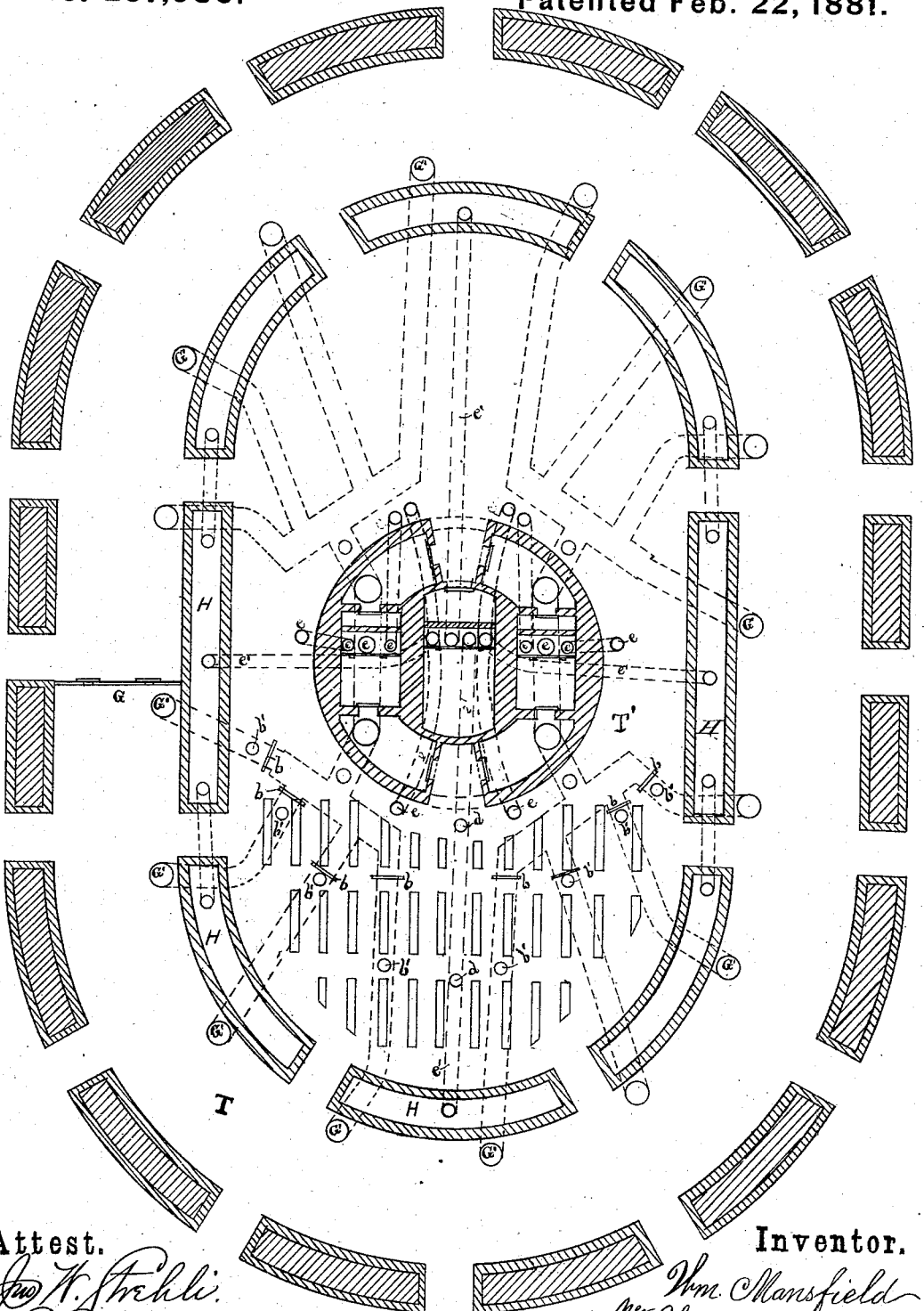

In the accompanying drawings, Figure 1 is a vertical central section of the lower portion of a chimney-stack constructed according to the plan of my invention, said section being taken at dotted lines $x\,x$, shown in Figs. 3, 4, 5, 6, and 7. Fig. 2 is a vertical central section of lower portion of same stack, taken at the dotted line Z Z of Figs. 3, 4, 5, 6, and 7. Fig. 3 is a ground plan of the stack, said plan being a horizontal section of the stack, taken at the dotted lines A A of Fig. 1. Fig. 4 is a horizontal section taken at the dotted line B B through Fig. 1. Fig. 5 is a horizontal section taken at the dotted line C C through Fig. 1. Fig. 6 is a horizontal section taken at the dotted line D D through Fig. 1. Fig. 7 is a horizontal section at the dotted line E E of Fig 1. Fig. 8 is a ground plan of my improved apparatus adapted to and in combination with a brick-kiln and drying-sheds. Fig. 9 is a vertical central section of stack, kiln, and sheds, taken longitudinally through Fig. 8. Fig. 10 is the ground plan of my chimney-stack arranged to use the screw-propeller shown in Fig. 11, which latter figure is a section through the line Y Y, Fig. 10.

Q represents the chimney, provided with vertical fan-chambers M, fed with smoke, gases, or air from the furnace or other apparatus of which the chimney is to be the outlet through a flue or flues, $e$, Fig. 3, whose mouths are closed by dampers, which are preferably operated from without the chimney by means of appropriate mechanism. These dampers are of any desired shape and construction. I prefer to employ one provided with an annular vertical flange projecting downward and adapted to fit over the mouth of the flues and extend into an annular channel which surrounds the mouth of each flue, said channel being kept full of water, into which the flange of the damper extends when the damper is closed. In each of these fan-chambers is a fan, $m$, fixed on a horizontal shaft, $o$, which rotates in boxes in the side walls, and preferably projects beyond the outside of the stack, so as to afford a more convenient point for the attachment of any gearing, &c., by which the power communicated by the fan to its shaft may be utilized in any convenient manner.

The fan-chamber below the fan is divided into two portions, M′ M², by means of a low wall, $h^2$, Fig. 3, which rises nearly to the bottom of the fans. The width of the space between the side of fan-chamber M and the fan is regulated by a damper, $p$, Fig. 4, hinged to the side of the chamber on a level with the fan-shaft, and the more nearly closed this orifice is the more ascending fluids will be forced against the wings of the fan and increase the speed and power of revolution of the latter. The arrangement of this wall $h^2$ and damper $p$ with relation to the fan $m$ is similar to the arrangement of the wall $h$ and damper $p'$ with reference to the blower R′ in the chamber R, as shown in section in Fig. 2.

The outlets to the fan-chambers M M are through the annular chamber M³, through the medium of passages $m'$, Fig. 1, between the chambers M and M³, which passages are not provided with dampers. The chamber M³ is provided with outlets, which are provided with dampers $g$, Figs. 1 and 2. When these dampers are removed from their respective openings the smoke, &c., are permitted to pass from the fan-chambers M M after passing over the fans $m$ $m$, through the chamber $M^3$, and into the chamber N, which is preferably closed at the top by the roof N', and provided with outlets $f^2$, Figs. 1, 2, 7, into the main flue P of the stack. The chamber $M^3$ does not extend entirely around the stack, but stops on either side at the wall $M^4$, Fig. 5. On either side of this wall is a flue, $m^2$, (shown in Figs. 2 and 5,) which affords communication between the chamber $M^3$ and the main flue of the stack P.

Another annular chamber, O, extends entirely around the stack, and is provided with passages $o'$, Figs. 1, 2, and 5, communicating with the outside of the stack, which passages are provided with appropriate dampers. This chamber O has no communication with the fan-chambers M, nor with the chamber $M^3$, but communicates with the main flue P through the passages $o^2$, Figs. 2 and 5, and also with the chamber N through openings which are provided with dampers $g'$, Figs. 1 and 2.

The chamber N is preferably separated into compartments by the walls $n$, Figs. 6 and 7, which are built up from the roof of the chambers $M^3$ and O, an opening, $n'$, being left in the base of each wall $n$, admitting of a free communication between the several compartments.

An opening, V, Fig. 6, which is protected by a door, affords opportunity for ingress to the chamber N to work dampers $g$ and $g'$, repair chamber, &c. Doors $N^2$ and $N^3$ afford ingress to the fan-chambers M.

R, Figs. 1 and 2, is a central chamber, in which is situated a large fan or blower, R', attached to the shaft $o$. A wall, $h$, Fig. 2, rises nearly to the blower, dividing the lower portion of the chamber R into two portions, $r$ $r'$, Figs. 2 and 3. Into the portion $r'$ of the chamber R open flues $e'$, which supply the blower with fluid upon which to act, and are provided with a damper similar to those described as covering the flues $e$ opening into the fan-chamber M.

The communication between the chamber R and the main flue P is through the openings $a$, Figs. 2 and 5, which are situated over the portion $r$ of the chamber R. Thus when the dampers over the openings of flues $e'$ are raised the current passes over the top of the wall $h$ and causes the blower to rotate in one direction, thus giving more power to the fans $m$.

At one side of the chamber R is the damper $p'$, Figs. 2 and 4, similar to the dampers $p$ in the fan-chambers M. This damper is hinged to the wall of the chamber and is capable of being raised and lowered, and when lowered, as shown in Fig. 2, does not permit any fluids to pass the blower without acting upon or being acted upon by the wings of the blower.

The chief office of the blower R' is to draw foul air, gases, &c., from mines or sewers, or to draw in fresh or heated air and force it to situations where it is needed through the passages $R^2$, Fig. 2. Its mode of operation will be hereinafter more fully described.

Immediately above the chamber R, and in the center of the shaft, is situated the fan or blower S, Fig. 2, attached to the shaft S', preferably extending through and outside of the stack, so as to afford more convenient points for attaching gearing, &c., by which the power communicated by the fan to its shaft may be utilized in any convenient manner. A wall, $h'$, rises nearly to the fan, and a damper, $p^2$, is hinged to the wall of the chamber. The office of this wall $h'$ and damper $p^2$ is the same as the like constructions in the fan-chambers M and R, and therefore does not need a more minute description. The motive power of this fan is received through the opening $a$ from the chamber R and the passages $m^2$ and $o^2$, Figs. 2 and 5, from the chambers $M^3$ and O. The damper which covers the openings $a$ is so constructed and hinged that when raised to uncover said openings it serves to direct the current under the fan and into the same channel taken by the current caused by the fluids coming from the passages $m^2$ and $o^2$.

It may be desired to use the fan S as a blower to force heated or fresh air into drying-sheds, mines, or other places where needed, in which case it may be done by adapting a damper so as to close the main flue P immediately above the blower, as shown by dotted lines, Fig. 9, and removing the damper covering the passage $s$. The shaft S' will then have to be connected to the shaft $o$ by band or appropriate gearing, in order that the blower S may receive motion through the medium of power communicated by the fans $m$ and R'. The air may then be carried to any desired place by a proper connection with the passage $s$.

One very useful combination in which I anticipate using my invention is that shown in Figs. 8 and 9—viz., in combination with a novel and useful form of brick-kiln, a ground plan of which is shown in Fig. 8 and a central section shown in Fig. 9—a description of which is as follows:

The kiln is preferably built in a circular or oval form, as shown in Fig. 8. The burning-chamber T extends entirely around the kiln, inclosing the drying-chamber T'. This burning-chamber is preferably divided into compartments by means of dampers, one of which is shown at G, Fig. 8. Each of these compartments has leading from it a flue, G', which leads to the stack in the center of the kiln. These flues are provided with dampers $b$ and outlets $b'$ into the drying-chamber T'. These outlets are provided with appropriate dampers. The inner wall of the burning-chamber is provided with a hot-air chamber, H. Flues $e'$, provided with outlets $d$ into the drying-chamber, lead from this hot-air chamber H to the stack. Other flues, $e$, lead from the drying-chamber T' to the interior of the stack. By the arrangement of the flues G' it will be seen, Fig. 8, that the kiln is divided into four sections, each of which may be used independently of the others.

The mode of operation of my improved stack is as follows: For convenience, I will first describe its operation as used in connection with a brick-kiln. When bricks or other clay goods are being burned a great deal of heat is produced, which, when the ordinary stack is used, is wasted, as there are no means of utilizing this waste heat. With my stack I have perfect control of this heated air. Should I wish to use the heated air in the drying-shed, I raise the damper $b$ of one or more of the flues G′, the dampers which are raised depending upon which of the compartments of the burning-chamber are being used when the heated air rushes through the flues G′ to the stack. The damper over the openings $e$ is now raised, and the heated air rushes into the fan-chamber M, causing the fan $m$ to revolve, which turns the blower R′. The damper over the openings $r^2$, between the annular chamber M³ and the chamber R, Fig. 2, is removed, the dampers $g$ being closed, and the air rushes into the chamber R. The damper over one or other of the passages R² is removed, and the blower R′ forces the heated air through the passage to any place where it is desired to conduct it. Heated air may also be drawn into the chamber R from the hot-air chamber H, Fig. 8, through the flues $e'$.

Should it be desired to use the fans and blower merely as a means of communicating motion to machinery, the dampers covering the outlets to the fan-chambers are removed, and all air entering the base of the stack through the various flues is made to pass the fans, causing them to revolve with great power. This power may be regulated by dampers covering the inlets to the stack, to regulate the amount of air which enters. Thus the more air entering the stack the greater the power communicated to the fans.

A means of giving additional power to the fan S is through the annular chamber O, Fig. 2. The dampers covering the openings $o'$ and passages $o^2$ are removed and the dampers $g'$ closed. The air, entering the chamber O from outside of the stack, then passes around said chamber and through the passages $o^2$ and acts upon the fan S. The smoke from the burning-chamber T or foul gases from mines or sewers may be conducted to the stack through the flues G′ or their equivalent, and carried directly up the stack, without entering the blower-chamber R, by opening the dampers $g$, as this will permit the smoke or foul gas to pass up through the fan-chambers M and through the openings $f^2$ into the main flue P. Thus the chamber R can be kept pure for the admission of pure air, which the blower R′ can force to positions where needed.

In using my invention as a means of ventilating mines or sewers, the principal of operation is the same as that described in the combination of the stack with a brick-kiln.

Any arrangement of flues may be used that may suggest itself, the prime object being to suck the foul air or gas from the mine or sewer, and by means of the blower R force fresh air in to take its place.

The great advantage of my improvement as a ventilator for mines over the ordinary form of ventilators is, that the foul air which is sucked from the mine or sewer by means of the draft of the stack can be made to act upon the fans $m$, causing them to revolve and give power to the blower R′, which forces fresh air into the mine to take the place of the foul air which is being drawn out.

The inlet-flues to the stack must be arranged according to the purpose for which the stack is to be used.

I have shown the most convenient arrangement of flues when used in connection with a brick-kiln. The most convenient and useful arrangement of the flues will readily suggest itself to the mind of the skilled mechanic, according to the purposes for which my invention is employed and the apparatus to which it is applied.

In using my stack as a means of power, should I find that power enough cannot be produced by the fans and blowers already described, I contemplate using in connection with them the screw-propellers L, Figs. 10 and 11. Each propeller is attached to a vertical shaft, L′, and is so constructed as to be capable of working independently, or to co-operate with the other propellers or with the fan S. A preferable method of connecting the propellers with the fan S is by attaching a gear-wheel, L⁴, to the shaft L′ and a similar gear-wheel to the shaft S′, to which the fan S is secured, and using an intermediate shaft between said gear-wheels. Air enters the propeller-chambers through the flues $l$, or through inlets $l'$ through the base of the stack into said chambers.

The flues $l$ may be separate and distinct from any other flues, or they may be connected by dampers with the flues coming from the furnace, or other place—as, for example, the flues G′, Fig. 8.

Flues L² at the side of each propeller serve to convey the smoke or gases up the stack when it is not desired to have the same pass through the propeller-chamber. A damper may be so arranged as to throw the draft into the propeller-chamber or the flue L², as may be desired.

The stack, when used for ventilating purposes in towns or cities, may be made of such a shape as to be an ornament to the same, or can be built up as a monumental tower, and used for both ventilating and sucking out the foul air or other obnoxious gases from the sewers, into which all smoke or other nuisances may be turned, and when drawn out burned over the furnace of fire kept burning day and night, so as to completely cleanse the said towns or cities from such nuisances; also, for fixing the electric light upon and giving motive power for working the same for illuminating purposes, and fixing an elevator thereto and balcony around the same for viewing the country around, and various other purposes.

Having thus fully described my invention and its mode of operation, what I claim as new and of my invention is as follows, viz:

1. In a chimney-stack, the combination of the fans $m\ m$, fans or blowers $R'$ S, and connecting draft-passages, for utilizing the draft in the stack as a means of power for turning machinery, &c., substantially as described.

2. In a chimney-stack, the combination of the fans $m\ m$, fan or blower $R'$, dampers $p$ and $p'$, and the draft-passages for causing draft to rotate said fans, substantially as and for the purposes specified.

3. The combination of the flues $e$ and fans $m\ m$, and the flues $e'$, fan or blower $R'$, and passages $R^2$, substantially as and for the purposes specified.

4. The combination of the flues $e$, fans $m\ m$, fan-chambers M M, chamber $M^3$, dampers $g$, chamber N, and outlet $f^2$ and P.

5. The combination of the flues $e$, fan-chamber M, passage $m'$, chamber $M^3$, flues $m^2$, fan or blower S, and the outlet P.

6. The chamber O, in combination with the passages $o'$, the flues $o^2$, and the fan or blower S.

7. The chamber R, in which the blower $R'$ operates, in combination with the openings $a$ and their damper and the fan or blower S.

8. The fan or blower S, in combination with the flues $m^2$ and $o^2$ and the chambers $M^3$ and O, said chambers being provided with air-inlets, substantially as described.

9. The combination of the chamber O, provided with inlets $o'$, the flues $o^2$, fan or blower S, and the passages $s$.

10. The fan-chamber M, in combination with the chamber $M^3$, the chamber N, provided with outlet $f^2$, and the main flue P.

11. The combination of a stack provided with the fans $m\ m$, and fans or blowers $R'$ and S, and the flues $G'$ of a brick-kiln, said flues being provided with the dampers $b$ and outlets $b'$, substantially as and for the purposes specified.

12. The combination of the propellers L, attached to shaft $L'$, gear-wheel $L^4$, attached to said shaft, and the fan or blower S, attached to shaft $S'$, and intermediate gear between said shaft $S'$ and the gear-wheel $L^4$, substantially as and for the purposes specified.

WILLIAM MANSFIELD.

Attest:
WILLIAM HOGAN,
JNO. W. STREHLI.